(Model.)

5 Sheets—Sheet 1.

H. R. BELDEN.
ANIMAL TRAP.

No. 533,111.

Patented Jan. 29, 1895.

WITNESSES:

INVENTOR
Howard R. Belden

BY

ATTORNEY (Model.)

H. R. BELDEN.
ANIMAL TRAP.

No. 533,111. Patented Jan. 29, 1895.

WITNESSES:

INVENTOR
Howard R. Belden
BY
ATTORNEY (Model.)

H. R. BELDEN.
ANIMAL TRAP.

No. 533,111.  Patented Jan. 29, 1895.

5 Sheets—Sheet 4.

WITNESSES:
J. F. Finch.
M. J. Longden.

INVENTOR
Howard R. Belden
BY
J. W. Smith Jr.
ATTORNEY (Model.)  H. R. BELDEN.  5 Sheets—Sheet 5.
ANIMAL TRAP.

No. 533,111.  Patented Jan. 29, 1895.

WITNESSES:
J. F. Finch.
M. T. Longden.

INVENTOR
Howard R. Belden
BY
O. M. Smith Jr.
ATTORNEY

UNITED STATES PATENT OFFICE.

HOWARD R. BELDEN, OF SANDY HOOK, CONNECTICUT, ASSIGNOR TO THE SANDY HOOK HARDWARE COMPANY, OF SAME PLACE.

ANIMAL-TRAP.

SPECIFICATION forming part of Letters Patent No. 533,111, dated January 29, 1895.

Application filed May 28, 1894. Serial No. 512,766. (Model.)

*To all whom it may concern:*

Be it known that I, HOWARD R. BELDEN, a citizen of the United States, residing at Sandy Hook, in the county of Fairfield and State of Connecticut, have invented certain new and useful Improvements in Animal-Traps; and I do hereby declare the following to be a full, clear, and exact description of the invention, such as will enable others skilled in the art to which it appertains to make and use the same.

My invention relates to certain new and useful improvements in animal traps and has for its object to provide a device of this description which shall be positive in its operation, and which will be automatically "set" by a rat or other animal when once caught therein.

In order that those skilled in the art may more fully understand my invention I will proceed to describe the construction and operation of the same referring by numbers to the accompanying drawings which form a part of this specification, and in which—

Figure 1:
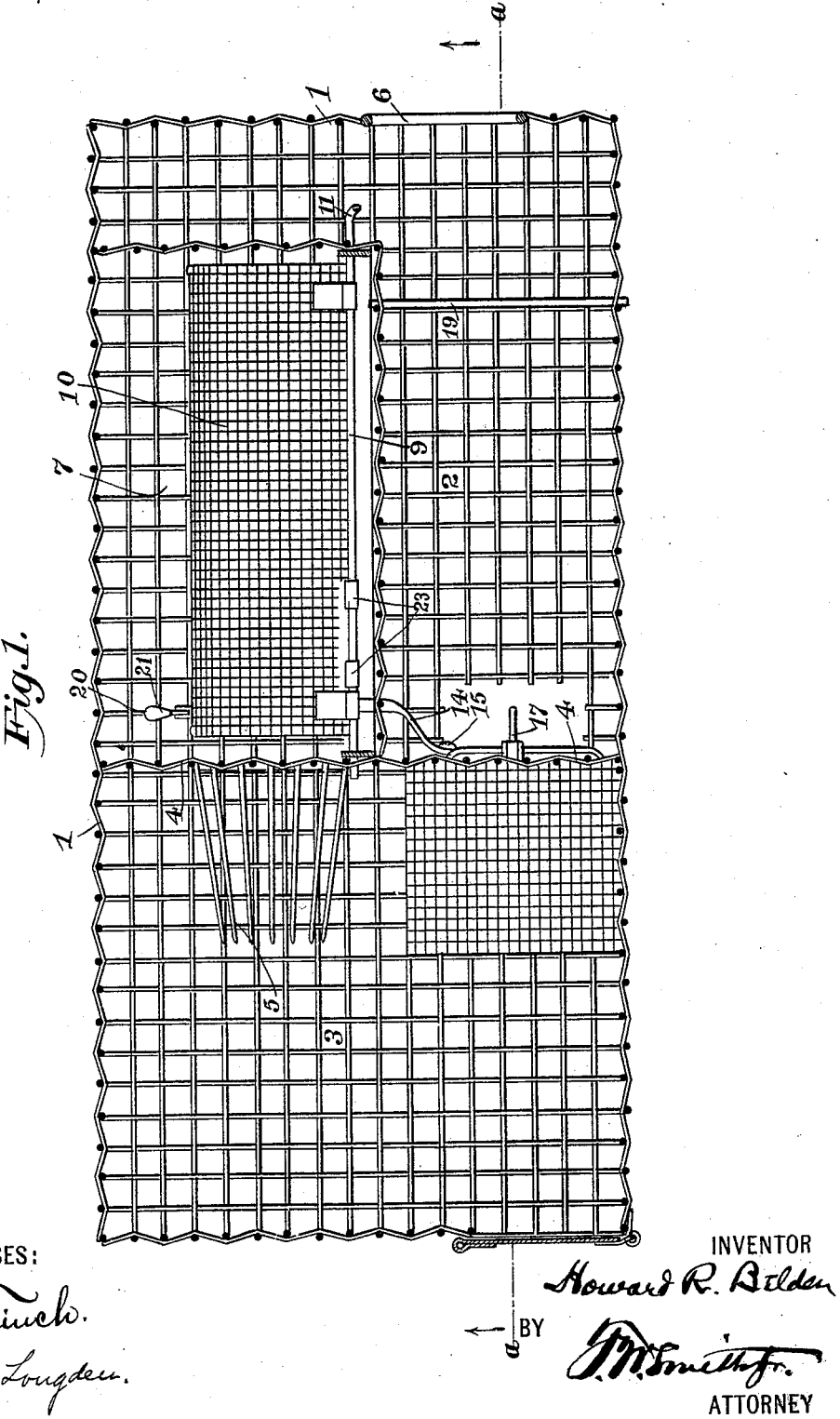
Figure 2:
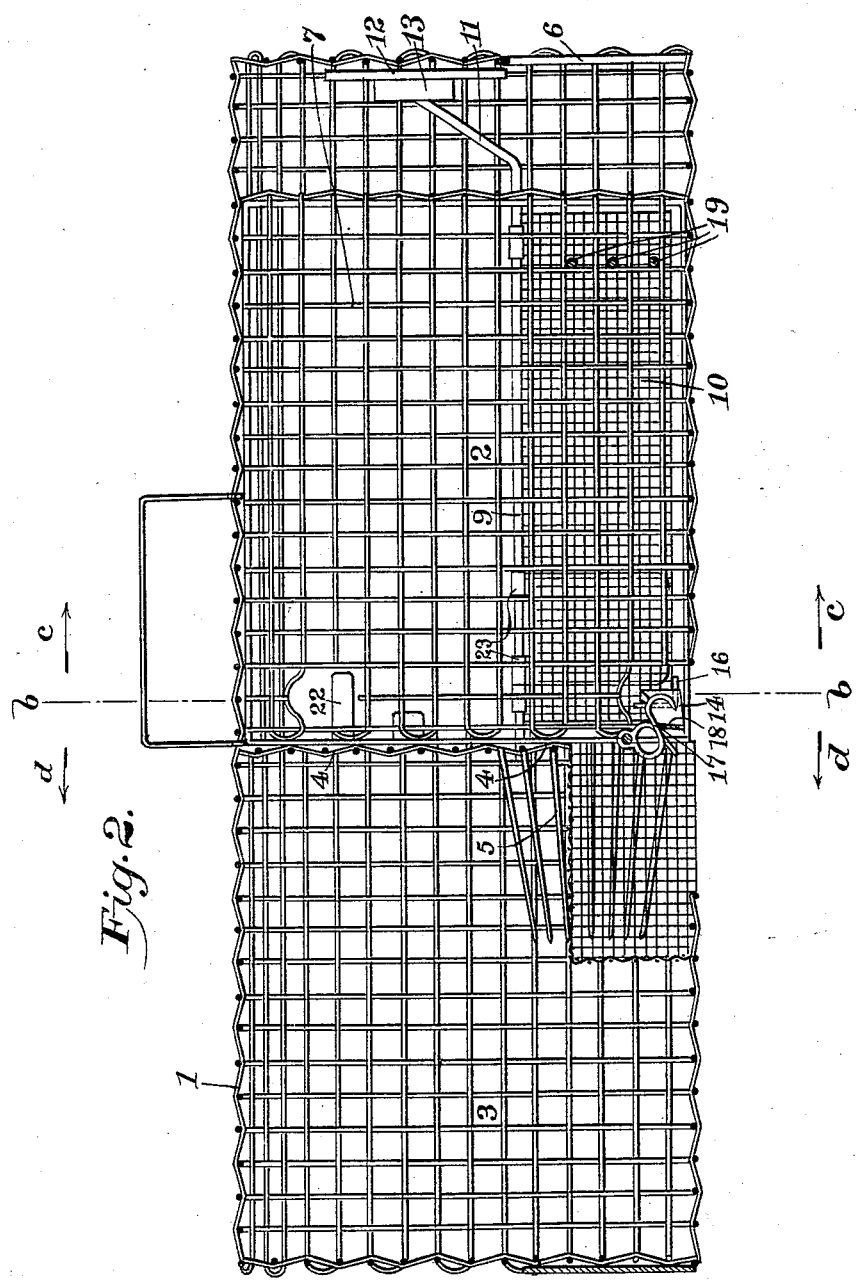
Figure 3:
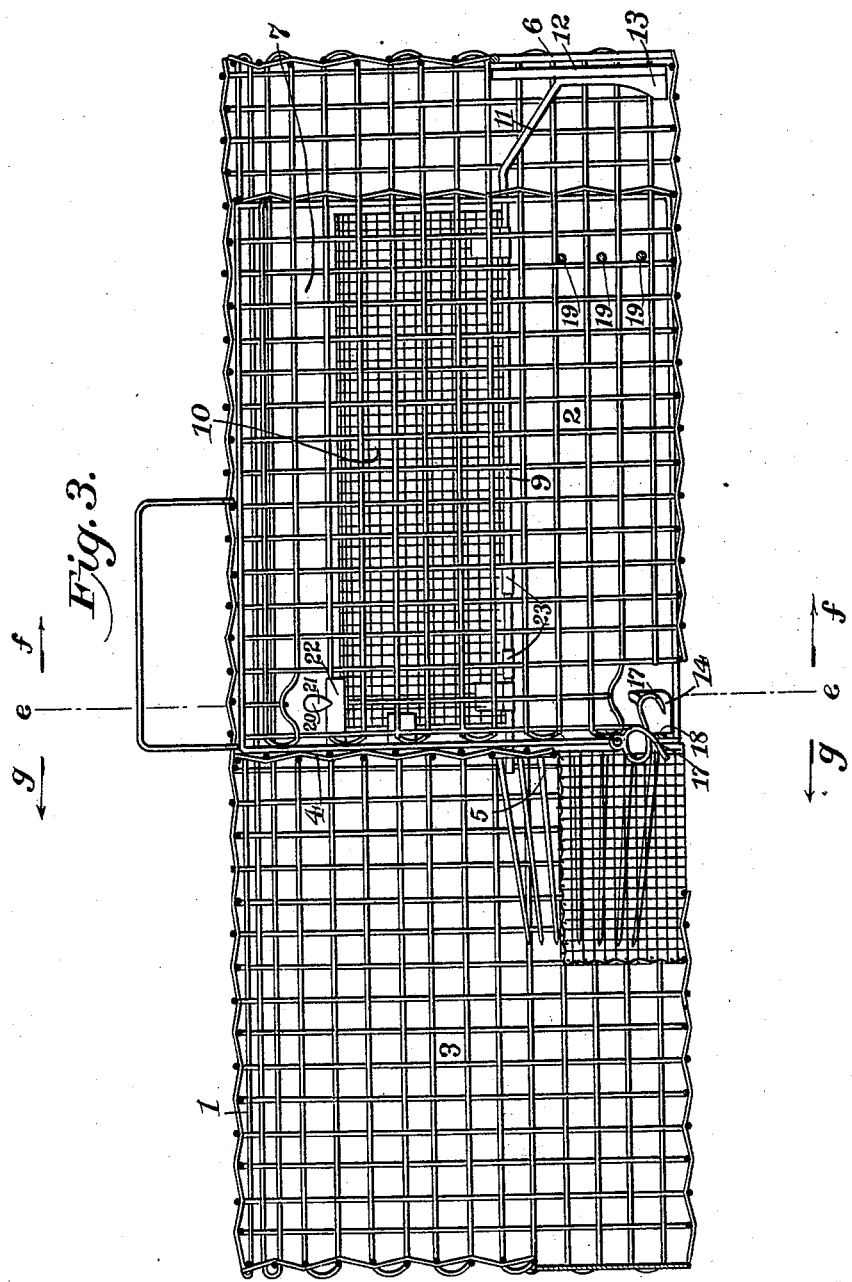
Figure 4:
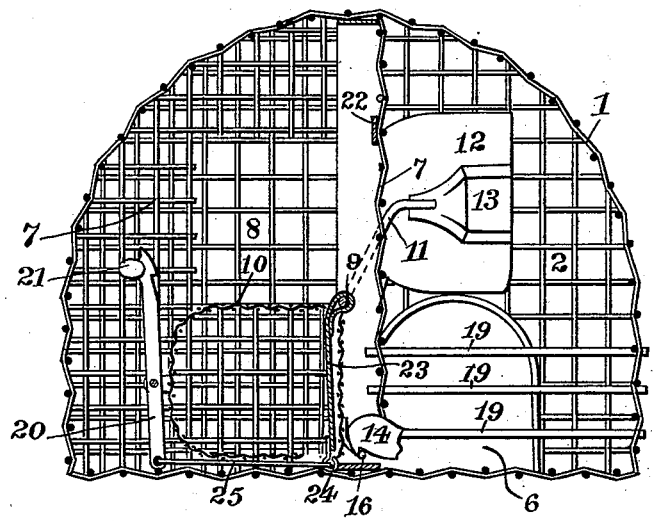

Figure 1 is a horizontal sectional elevation of my improved trap; Fig. 2, a section at the line *a, a*, of Fig. 1 with the box swung to its lowest position; Fig. 3, a view similar to Fig. 2, but with the box elevated to its highest position; Fig. 4, a section on the line *b, b*, of Fig. 2 looking in the direction of the arrows *c, c;* Fig. 5, a section on the line *e, e*, of Fig. 3 looking in the direction of the arrows *f, f;* Fig. 6, a section on the line *b, b*, of Fig. 2 looking in the direction of the arrows *d, d*, and Fig. 7 a section on the line *e, e*, of Fig. 3 looking in the direction of the arrows *g, g*.

Similar numbers of reference denote like parts in the several figures of the drawings.

1 is the body of the trap made from the 
usual wire netting and divided into two main compartments 2, 3, by means of the partition 4.

5 is an ordinary inlet from the compartment 2 into the compartment 3, said inlet being made from wires slightly contracted so as to admit of the passage of an animal toward the contracted end of the inlet but preventing any backward movement of such animal after a part of his body has once passed beyond such contracted end.

6 is the inlet into the compartment 2 through which the animal may enter.

Figure 5:
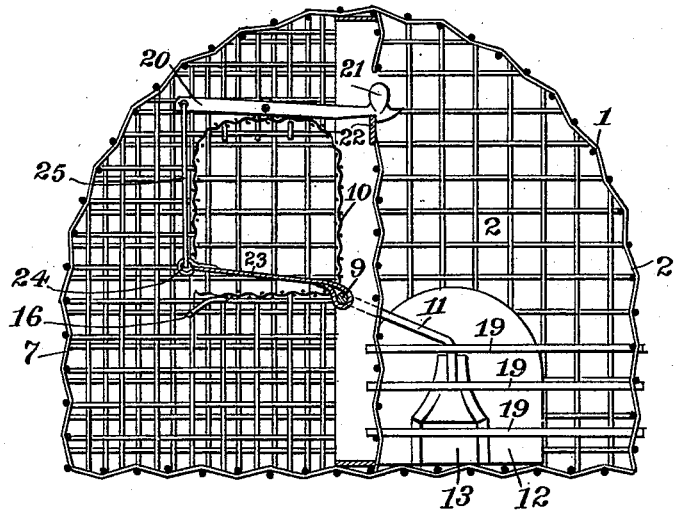

7 is a cage within the compartment 2 at one side thereof, and having an opening 8 at the upper portion of its front part communicating with the compartment 2. Journaled within this cage and lengthwise thereof is a rod 9 to which is secured within such cage a box 10. The forward end of this rod is bent into the form of a crank 11 to the end of which latter is secured a door 12. When the box drops to its lowermost position as shown at Fig. 4, the door 12 will thereby be elevated by the turning of the rod 9 so as to free the passage into the compartment 2, but when such box is swung to its highest position as shown in Fig. 5, said door will thereby be operated to close the opening 6. The door is weighted as seen at 13 so as to constitute an overpoise, whereby, unless the box is secured in its lowest position by some fastening device, said box will be automatically elevated by the dropping of the door. I have, however, provided devices for securing the box in its lowest position against the gravity action of the door which devices I will now describe.

Figure 6:
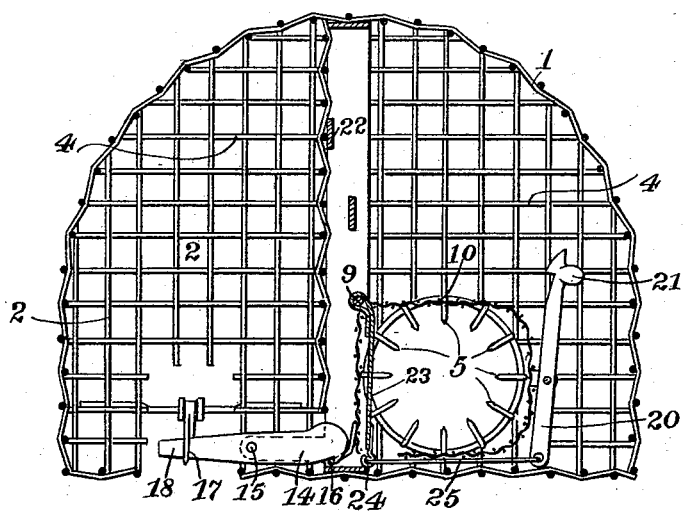

14 is an ordinary bevel nose gravity hook pivoted at 15 to the partition 4 near the floor of the body, and 16 is a cross pin secured to the box and depending therefrom, which pin when the box is swung downward, will strike against the bevel nose of the hook 14 whereby the latter will be lifted so that the hook will engage over said pin to hold the box as against upward movement, as shown at Figs. 4 and 6.

17 is the bait hook pivoted to the partition 
4 and immediately overhanging a tail 18 which extends rearward from the hook 14 beyond its pivotal point. This bait hook is immediately beyond the opening 6 but I have provided cross bars 19 between said hook and opening, in order to prevent an animal from reaching the bait while any part of its body is within said opening. These cross bars force an animal to entirely clear the opening before it is enabled to get at the bait, and while this is a good feature I do not wish to be limited thereto since the bars are precautionary rather than necessary.

Figure 7:
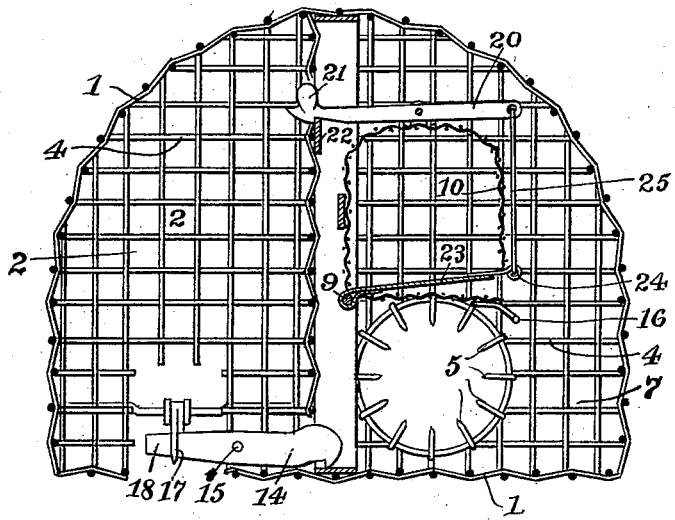

Presupposing the box to be in the position shown at Fig. 6 any tugging at the bait hook will swing the latter down against the tail 18, thereby elevating the nose of the hook 14 and permitting the weighted door 12 to drop and elevate the box to the position shown at Fig. 7. The box is open at both ends, and when it is elevated its front end will come opposite to the opening 8, thereby providing an entrance from the compartment 2 into the box, and when the inlet 6 has been closed by the door 12, an animal who has caused this closing of the opening by his efforts at the bait will in his fright seek any opening, and will invariably pass through the opening 8 into the box 10. Pivoted to the top of the box is a bevel nosed hook 20 whose forward extremity is slightly weighted as seen at 21, and when the box is swung upward the nose of this hook will strike any stationary part, as for instance a lip 22 secured to the frame of the cage 7, and thereby be lifted so as to permit said hook to engage over said lip and thereby hold the box in its elevated position. Pivoted around the rod 9 is a flat leaf 23 made from tin or sheet metal which extends within the box in a horizontal position in close proximity to the floor thereof. To the outer end of this leaf is secured a hook 24, and 25 is a link whose ends are loosely connected to said hook and to the tail of the hook 20. When the hook 20 is engaged over the lip 22 to hold the box in elevated position, the leaf 23 will thereby be raised clear of the floor of the box 10, but it will be obvious that any weight brought to bear upon this leaf will raise the hook 20 and thereby leave the box free to swing downward. When an animal dashes into the box as hereinbefore set forth and treads upon this leaf 23 the hook 20 will be elevated and the box will swing downward owing to the weight of the animal and will be locked in its lowest position by means of the hook 14 as previously set forth. This downward movement of the box will bring its rear end into alignment with the inlet 5 through which latter the animal will plunge in its endeavor to escape. It will be observed that this downward swing of the box not only is the means of discharging an animal into the compartment 3, but also effects the proper "setting" of the trap. The action of my improved trap is therefore automatic, and the tilting box alternately communicates with the compartments 2 and 3.

Of course various fastening devices may be employed for the purpose of holding the box in its two positions, it being essential only that the disengaging of these fastening devices should be effected respectively by the tugging at the bait and by the treading of an animal within the box.

It is not necessary that the door should be weighted, for the overpoise may be at the end of a separate crank arm projecting from the rod 9, nor is it necessary that the door should swing in the arc of a circle, since said door may easily be arranged to slide up and down and be operated by the crank 11.

I have heretofore described the box as capable of tilting in a plane at right angles to its length, but it is obvious that the rod 9 may be extended beneath the middle portion of the box at right angles to the position shown, so that the latter will be capable of tilting in the direction of its length so as to bring its open ends alternately into communication with the compartments 2 and 3. The gist of my invention in this respect rests in the broad idea of tilting this box, in the first place by tugging at the bait, to close the door and to establish communication between the compartment 2 and said box and in the second place to shut off the box from the compartment 2 and to establish communication between said box and the compartment 3, and furthermore to open the door and set the trap.

Having thus described my invention, what I claim as new, and desire to secure by Letters Patent, is—

1. An animal trap comprising a main body divided by a cross partition into a detaining compartment and a trapping compartment, a cage within the latter compartment and having openings which communicate respectively with both of said compartments, a pivoted box within said cage and open at both ends and capable of tilting whereby said ends may register respectively with said openings, devices for locking said box in its lowered position, means for normally elevating said box, the bait hook capable of operating in connection with said locking devices to release the box whereby the latter will swing to its elevated position, a latch for locking said box in its last mentioned position, and means carried by said box and capable of being operated by the tread of an animal therein whereby said latch may be withdrawn and the box allowed to swing to its lowered position, substantially as set forth.

2. In an animal trap, the combination of a detaining compartment and a trapping compartment, an inclosure within said trapping compartment having in different horizontal planes openings which communicate respectively with said compartments, a pivoted box within said inclosure and open at both ends and capable of swinging downward and upward whereby said box is respectively brought into communication with said compartments, devices for locking said box in its two positions, the pivoted bait hook, and appliances automatically operated respectively by the tugging at said hook and the tread of the animal within said box for releasing said locking devices, substantially as set forth.

3. An animal trap comprising a body partitioned into a trapping compartment having an inlet for the animals and a detention compartment, a cage in the trapping compartment having openings in different horizontal planes communicating respectively with the two compartments, a box open at both ends and pivoted within said cage and capable of swinging upward and downward whereby the open ends of the box may register respectively with the openings in the cage, a door moving in harmony with and operated by said box whereby said inlet may be opened and closed, appliances for automatically locking the box in its elevated and lowered positions, the bait hook pivoted at the end of the trapping compartment and in proximity to the appliances for locking the box in its lowered position whereby when said hook is tugged said appliances will be released thereby permitting said box to swing to its elevated position and closing the door to the inlet of the trapping compartment, and means within said box and capable of being operated by an animal therein whereby the appliances which lock the box in elevated position may be released thereby permitting said box to swing to its lowest position and opening the door to the inlet of the trapping compartment, substantially as set forth.

4. In an animal trap, the combination of detaining and trapping compartments, a cage within the trapping compartment having openings in different horizontal planes which respectively communicate with said compartments, a box open at both ends and inclosed by said cage and capable of swinging whereby said ends may register alternately with said openings, means for automatically locking said box in elevated and lowered positions, means for normally elevating said box, a door moving in harmony with and operated by said box whereby the inlet to the trapping compartment is opened and closed, the bait hook, and appliances automatically operated by the animal for withdrawing the locking devices which hold the box in its elevated and lowered positions, substantially as set forth.

5. The combination of the compartments 2, 3, the cage within the compartment 2 and having opening 8 and inlet 5 leading respectively into said compartments 2, 3, the box pivoted within said cage and open at both ends, means for normally elevating said box, means for automatically locking said box in elevated and lowered positions, and automatically controlled appliances for releasing said box and permitting it to swing upwardly or downwardly whereby it may alternately be in communication with said compartments 2, 3, substantially as set forth.

In testimony whereof I affix my signature in presence of two witnesses.

HOWARD R. BELDEN.

Witnesses:
F. W. SMITH, Jr.,
M. T. LONGDEN.